UNITED STATES PATENT OFFICE.

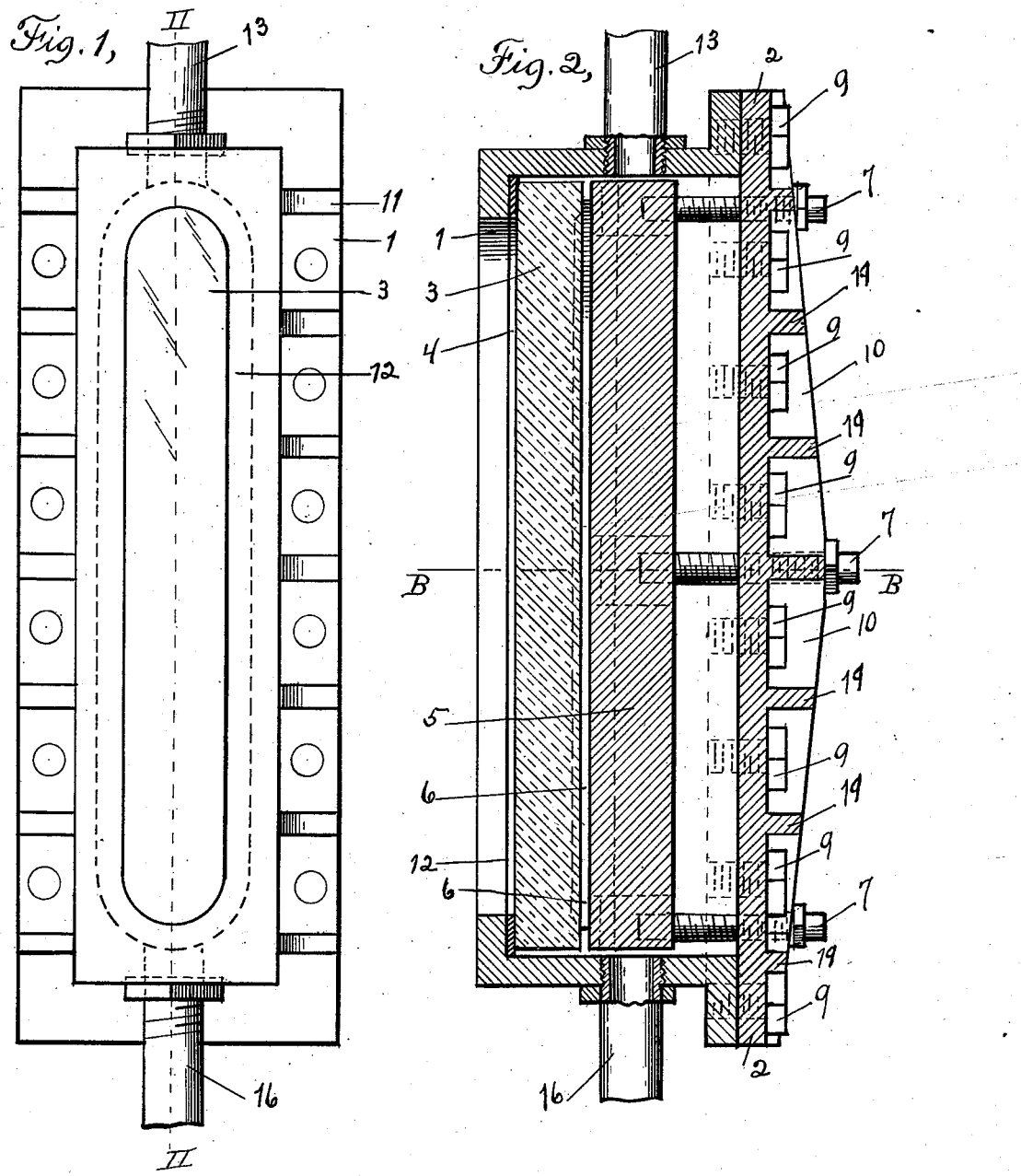

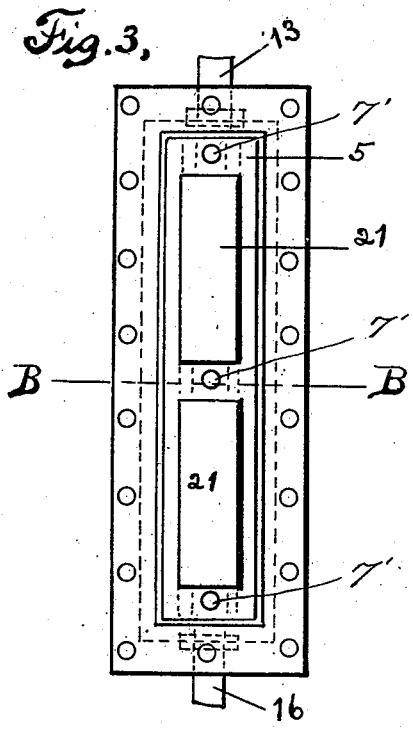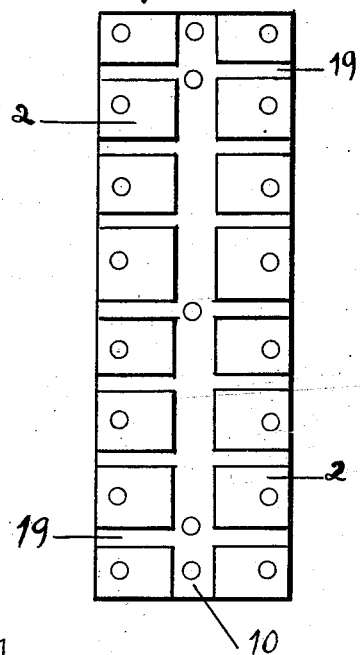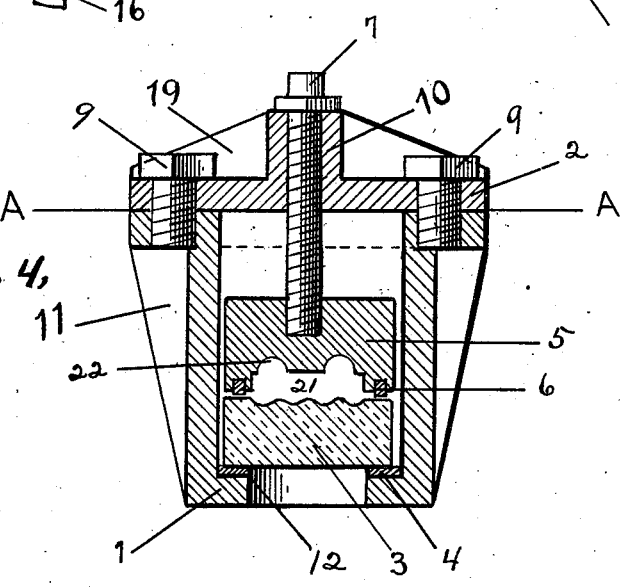

ABRAM VAN BRUNT, OF BRIDGEPORT, CONNECTICUT.

WATER-COLUMN.

1,001,099.  Specification of Letters Patent.  Patented Aug. 22, 1911.

Application filed October 25, 1910. Serial No. 589,087.

*To all whom it may concern:*

Be it known that I, ABRAM VAN BRUNT, a citizen of the United States, and a resident of Bridgeport, county of Fairfield, and State of Connecticut, have invented certain new and useful Improvements in Water-Columns, of which the following is a full, clear, and exact description.

This invention has for its object to provide an improved form of water glass in which the rear member is removable to permit the insertion and replacement of the gage glass together with its packing members and a frame member, all of which members are removable through the rear opening of the casing that is closed by this cover.

A further object of the invention is to provide an improved form of packing member or gasket device between the rear of the gage glass and the removable frame member, that will permit the free circulation of the water through the device at the rear of the gage glass, and that will also freely admit of expansion and contraction of the glass, and thereby avoid any liability of cracking or breaking the glass by the changes of temperature incident to the use of such device, especially in connection with steam boilers.

With these objects in view, the invention will be hereinafter more particularly described with reference to the accompanying drawings, which form a part of this specification, and will then be pointed out in the claim at the end of the description.

In the accompanying drawings illustrating one embodiment of my invention, Figure 1 is a front view of the device. Fig. 2 is a vertical section on the line II—II of Fig. 1. Fig. 3 is a rear elevation as would appear on the line A—A shown in Fig. 4, that is with the rear cover removed. Fig. 4 is a transverse section on the line B—B indicated in Fig. 3. Fig. 5 is a rear view of the cover.

The body of casing 1 has the usual pipe connections 13 and 16 at the top and bottom, the casing having its top and bottom walls otherwise closed and also the two side walls, with the rear being open for the full width and height of the inner portion of the casing. At the sides are ribs 11 to strengthen the back. At the front is an opening extending longitudinally so as to leave an annular marginal portion 12 against which the glass 3 is placed, with interposed gasket 4. At the rear of the casing is a cover or back member 2 shown separately in Fig. 5. The cover is provided with a longitudinal rib 10 extending at the middle, and cross-ribs 19 to strengthen the member. At the marginal portions are bolts 9 passing through holes in the cover and engaging threaded bores in a flange 15 extending all around the rear opening of the casing, by which the cover is secured to the casing, to close the rear opening by a water-tight joint.

The frame member 5 is formed a little smaller than the opening in the casing, to be inserted from the rear, and is placed against the glass 3, or against interposed packing member 6, and held in place by means of bolts 7 passing through apertures in the web 10 of the cover, and entering suitable sockets 7' in the frame member, to support it in position. A suitable packing member is provided between the frame 5 and the glass 3, and may be formed of longitudinal strips 6 placed in slots 17 in the front face of the frame member 5, which strips are of less length than the glass and frame, and thereby provide a free circulation for the water or fluid and gas back of the glass. The glass 3 has grooves 22 in its rear face for the water. By this arrangement it will be seen that the glass is clamped between the gasket 4 pressing against the margin of the front opening, and a rear packing member formed of the strips 6 that are pressed against the glass by the frame 5, the latter being secured in position by the adjusting bolts 7 passing through the cover. The rear opening of the casing being closed by the cover 2, can be readily removed by taking out the bolts 9, that will withdraw the locking screws 7 that are carried by the cover. This will release the frame member 5 that can be drawn rearward through the opening and the latter operation will remove the support of the glass, which together with the two packing members can be readily removed and replaced. It will be further seen that the sight glass can expand in all directions in its margin by reason of the two packing strips at the rear, and also with the water, it has a free circulation around and back of the sight glass whereby its flow will not become impeded and the water level can at all times be seen.

I claim—

A water gage comprising a casing having an open rear and a front sight opening, said sight opening being surrounded by an inwardly projecting flange and said open rear being surrounded by an outwardly projecting flange, a transparent closure for the sight opening, a sealing cover detachably connected to the rear flange, said cover being provided with a central longitudinally extending reinforcing rib, a frame member within the casing, said member and transparent closure having their confronting surfaces shaped to provide a fluid passage, and fasteners extending through said rib and engaging said frame member.

This specification signed and witnessed this twenty first day of October A. D. 1910.

ABRAM VAN BRUNT.

Witnesses:
JOHN ALLEN,
JAMES J. HILLEGASS.